(12) United States Patent
Kumar et al.

(10) Patent No.: US 8,666,877 B2
(45) Date of Patent: Mar. 4, 2014

(54) STOCK RANKING PREDICTIONS BASED ON NEIGHBORHOOD MODEL

(71) Applicant: The Florida State University Research Foundation, Inc., Tallahassee, FL (US)

(72) Inventors: Piyush Kumar, Tallahassee, FL (US); Rajat Raychaudhuri, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 14/016,855

(22) Filed: Sep. 3, 2013

(65) Prior Publication Data

US 2014/0006313 A1    Jan. 2, 2014

Related U.S. Application Data

(63) Continuation-in-part of application No. 13/865,676, filed on Apr. 18, 2013.

(60) Provisional application No. 61/635,039, filed on Apr. 18, 2012.

(51) Int. Cl.
*G06Q 40/00* (2012.01)

(52) U.S. Cl.
USPC .................................... 705/37; 705/38

(58) Field of Classification Search
USPC ...................................... 705/35–40
See application file for complete search history.

(56) References Cited

U.S. PATENT DOCUMENTS

| | | | |
|---|---|---|---|
| 2002/0095362 A1* | 7/2002 | Masand et al. | 705/35 |
| 2010/0057586 A1* | 3/2010 | Chow | 705/26 |
| 2010/0280976 A1 | 11/2010 | Carpenter et al. | |

* cited by examiner

*Primary Examiner* — Thu Thao Havan
(74) *Attorney, Agent, or Firm* — Nicholas Pfeifer; Smith & Hopen, P. A.

(57) ABSTRACT

A system and method of aggregating and predicting stock ranking stocks. The novel system and method uses a neighborhood model to aggregate a plurality of "neighboring" or related stocks having similar pricing trends. The system and method then uses a ranking optimization method to predict the ranking of each stock based on percentage change in price. The current invention facilitates investors trading by using a novel methodology to predict stock rankings and providing a neighborhood of related stocks, while having an easy-to-use interface.

14 Claims, 3 Drawing Sheets

STOCK RANKING PREDICTIONS BASED ON NEIGHBORHOOD MODEL

BACKGROUND OF THE INVENTION

1. Field of the Invention

This invention relates, generally, to stock analysis. More particularly, it relates to a method for producing a stock neighborhood and predicting the ranking of stocks.

2. Description of the Prior Art

The financial market has always been under close scrutiny by a host of players with varied interests. Yet, due to the profit sensitive nature of the context, the existing literature is by no means complete and/or succinct.

Prominent firms tend not to publish their work since that analyses is their bread and butter. Academicians mostly stop at theorizing since the continual financial feed and other experiments are difficult to obtain.

Attempts have been made in ranking and/or modeling the performance of stocks using neural nets, but this conventional approach tends to be ineffective and time-consuming.

Because of feelings of unpredictability in stocks, few people actually attempt the stock market as a serious money making option. The web interface between the investor and the market also has not evolved much and more importantly is not an inviting one. As a result, despite being a lucrative option, the market has not been able to attract as many investors as it should have been by this day given the advancement of computing power.

People want information, rather than data, yet many of the prominent financial websites (e.g., GOOGLE Finance, YAHOO Finance, FIDELITY, CNN Money, etc.) stop only at providing the end user with a vast amount of data in an uninviting interface. As depicted in FIG. 1, the NEW YORK TIMES published a report in August 2009 claiming that fewer people are using the finance pages of GOOGLE compared to its other services. It becomes very difficult for a budding investor to arrive at a verdict about a stock based only on that data unless he/she is a finance guru. Instead of guiding the user, the overwhelming number of market parameters and business documents often scare the user away from making a trade.

The interfaces provided by these finance firms are neither complete nor succinct. Most of these websites provide a snapshot of the behavior of a stock in their main page with some predictions (using a green ↑ symbol or a red ↓ symbol) about the stock price. There is no way to know how accurate their forecasts have been in the past. Regardless, the user cannot rank the stocks based on different parameters, such as P/E Ratio, percentage change in price, EPS forecast, etc.

None of these firms rank stocks that fall within a given price range. None of the firms have the feature to rank or recommend stocks given a certain price range.

While analyzing the stock market, academicians mostly stop at theorizing since the continual financial feed is expensive. Most researchers deal with per day samples. Given the growth of processing power and applications based on machine learning algorithms in last decade, the existing technology in this area is conspicuously poor.

U.S. Patent Application Publication No. 2010/0280976 discloses aggregating investment data and real-time trade data of investors and ranking the investors according to investment performance derived from the investment data. This patent application ranks an investor portfolio based on acquired profit. In contrast the current invention predicts stock rankings based on the percentage change in price of the stocks.

Accordingly, what is needed is an effective mechanism of producing a stock neighborhood and predicting stock rankings. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more effective and accurate method of comparing stocks and predicting stock rankings is now met by a new, useful and nonobvious invention.

The current invention gathers and stores financial data on a daily basis, applies collaborative learning algorithms on the gathered financial data, produces a plurality of neighbors for each stock, and predicts the ranking of stocks based on the percentage change in price on previous days.

To achieve solutions to these problems, the current invention projects each stock as a point on a higher dimensional space (e.g., ten dimensional space). Then approximate nearest neighbor algorithms are used to build the neighborhood model. It is hypothesized that the pricing trend of a stock can be guessed in the near future given the knowledge of its neighbor.

Certain embodiments of the current invention may use other forms of financial data to produce a stock neighborhood, including earning capability, P/E ratio, traded volume, etc.

The current invention further includes predicting rankings of stocks registered at NASDAQ based on different market parameters, such as earning capability, P/E ratio, traded volume, etc.

Certain embodiments of the current invention also include ranking of stocks within a given sector, such as energy, electronics, etc.

Certain embodiments of the current invention also include rank charts, which are charts that depict a stock's rank at different hours of the day, rather than the price of the stock. This is in contrast to a continuous curve showing stock price. The rankings would be calculated after a certain interval and shown accordingly. The value of this interval can be configured by the administrator of the system.

Certain embodiments of the current invention also include a recommendation based on portfolio and budget.

Certain embodiments of the current invention also include a short term prediction with reason (i.e., why stock X was given rank 1) and past accuracy in prediction.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The current invention utilizes a web crawler that gathers financial data from the web and stores it in a database. The data can be gathered in a periodic manner, such as each night after the close of business and is gathered from financial institutions like Goldman Sachs, Morgan Stanley, etc. Another embodiment of the invention could gather financial data from any source. The current invention gathers financial data for producing the stock neighborhood (neighborhood data) and for predicting stock rankings (prediction data). The current invention uses neighborhood data in the form of analysts' opinions and prediction data in the form of opening and closing prices of stock. Another embodiment could use other financial data such as earning capability, P/E ratio, traded volume, etc.

Figure 1:
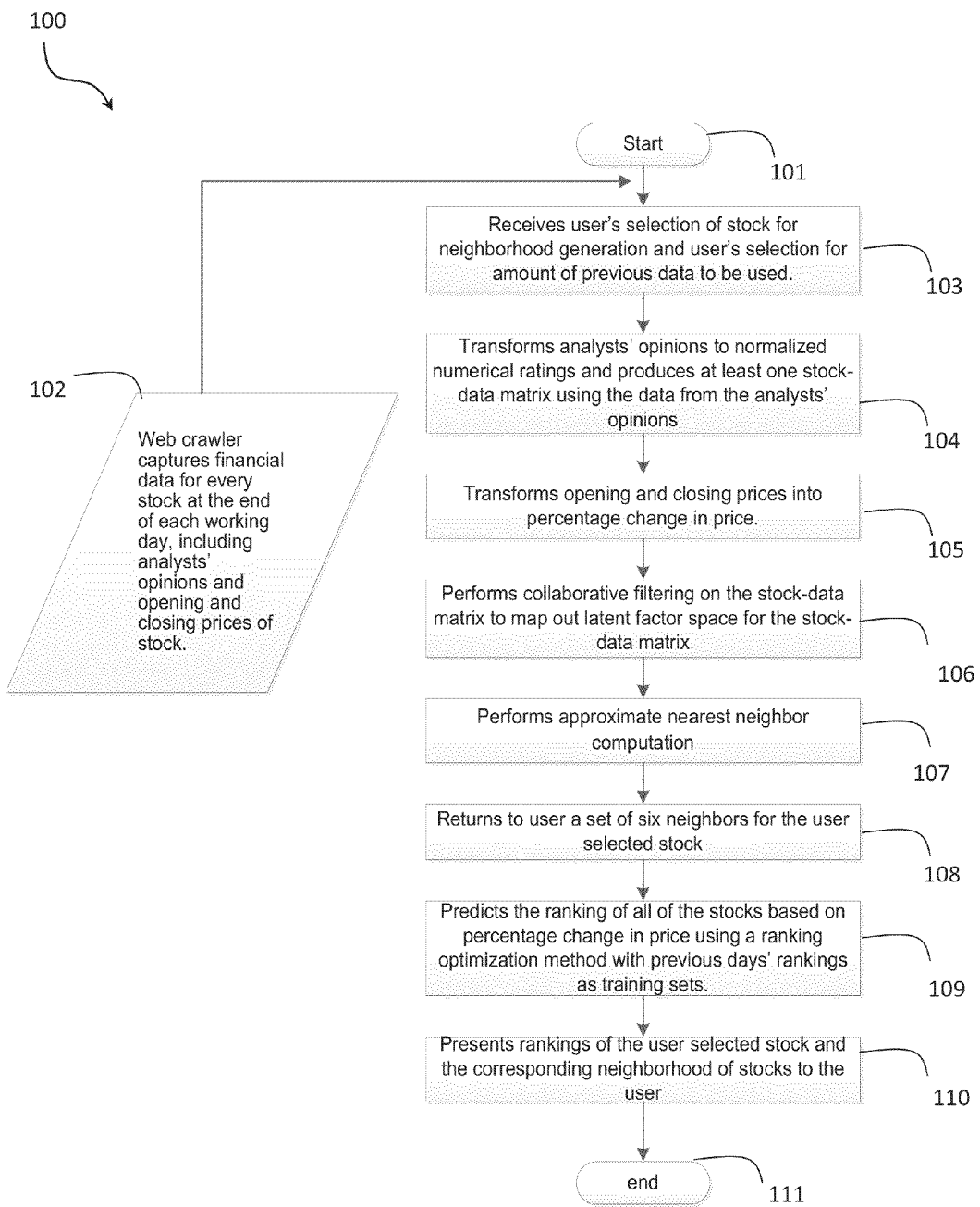
FIG. 1 is a diagrammatic view of the preferred embodiment of the invention.

As shown in FIG. 1, the user starts the program (101) and the preferred embodiment of the current invention (100) allows a user to select a stock and the amount of pervious data to be used (103). The current invention takes analysts' opinions and transforms the opinions from the gathered form of "buy", "outperform", "neutral", "underperform", or "sell", into normalized numerical ratings and produces a stock-data matrix (104). The current invention also transforms the opening and closing prices into percentage change in price (105). The current invention then applies collaborative filtering to the stock-data matrix to map out a latent factor space (106). The current invention performs an approximate nearest neighbor computation (107) and returns six stock neighbors to the user (108), which will have similar pricing trends to the selected stock. Next, the current invention predicts the rankings of all stock based on percentage change in price using a ranking optimization method with previous days' rankings as training sets (109). The predicted rankings of the selected stock and the neighbor stocks are returned to the user (110) and the program ends (111).

Figure 3:
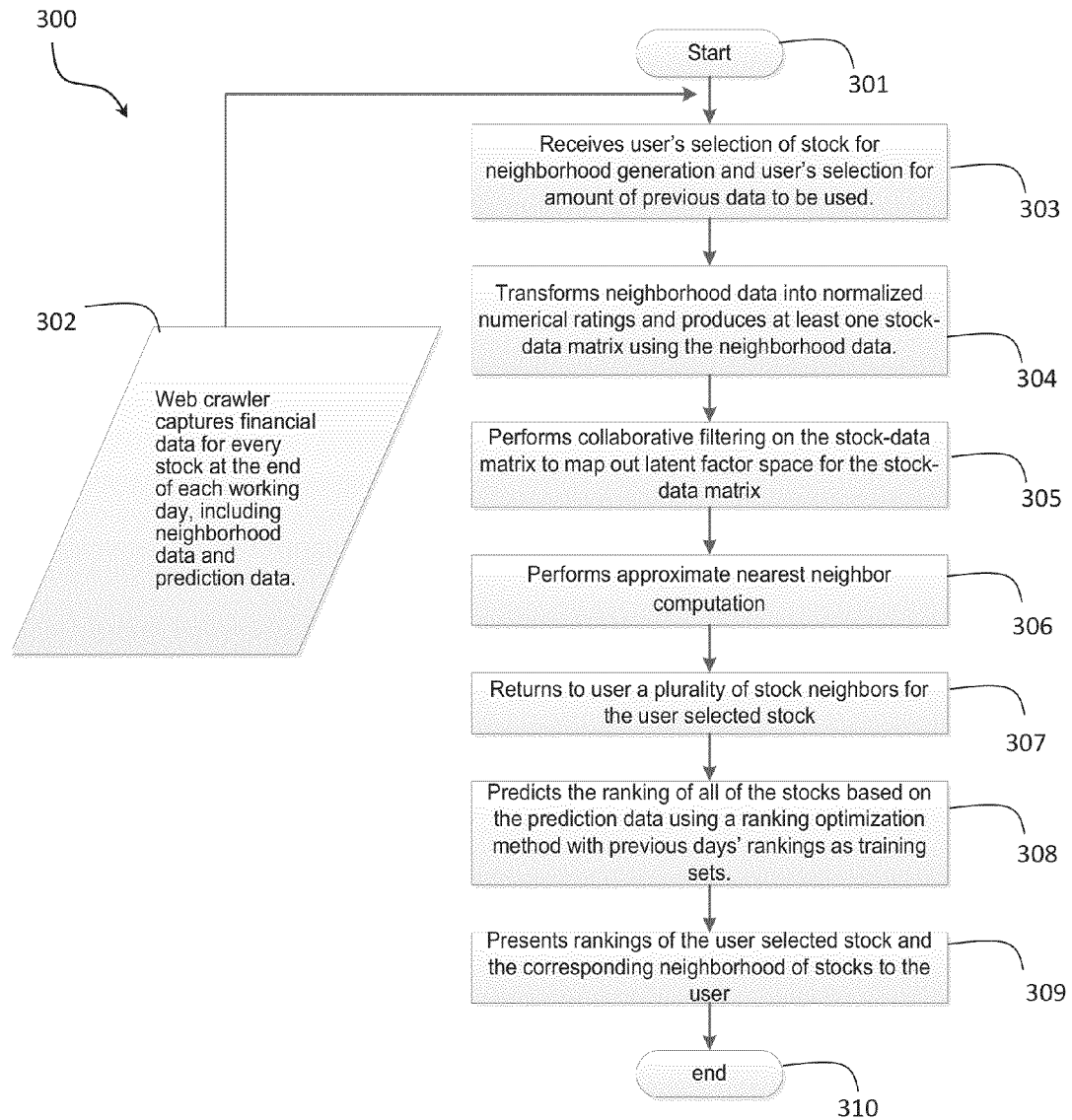
FIG. 3 is a diagrammatic view of another embodiment of the current invention.

As shown in FIG. 3, another embodiment of the current (300) may use other financial data such as earning capability, P/E ratio, traded volume, etc. The other embodiment similarly gathers the financial data (302). The user starts the program (301), selects a stock for neighborhood generation, and selects the amount of previous data to be used (303). The program transforms the neighborhood data into normalized numerical ratings and produces a stock-data matrix (304). The current invention then applies collaborative filtering to the stock-data matrix to map out a latent factor space (305). The current invention performs an approximate nearest neighbor computation (306) and returns a plurality of stock neighbors to the user (307), which will have similar pricing trends to the selected stock. Next, the current invention predicts the rankings of all stock based on the prediction data using a ranking optimization method with previous days' rankings as training sets (308). The predicted rankings of the selected stock and the neighbor stocks are returned to the user (309) and the program ends (310).

Many features of the current invention can be implemented using filters. Filters may appear on the interface (i.e., the website) as drop-down menus and/or check boxes. The user may also have the ability to create an account to store a personal portfolio.

Figure 2:
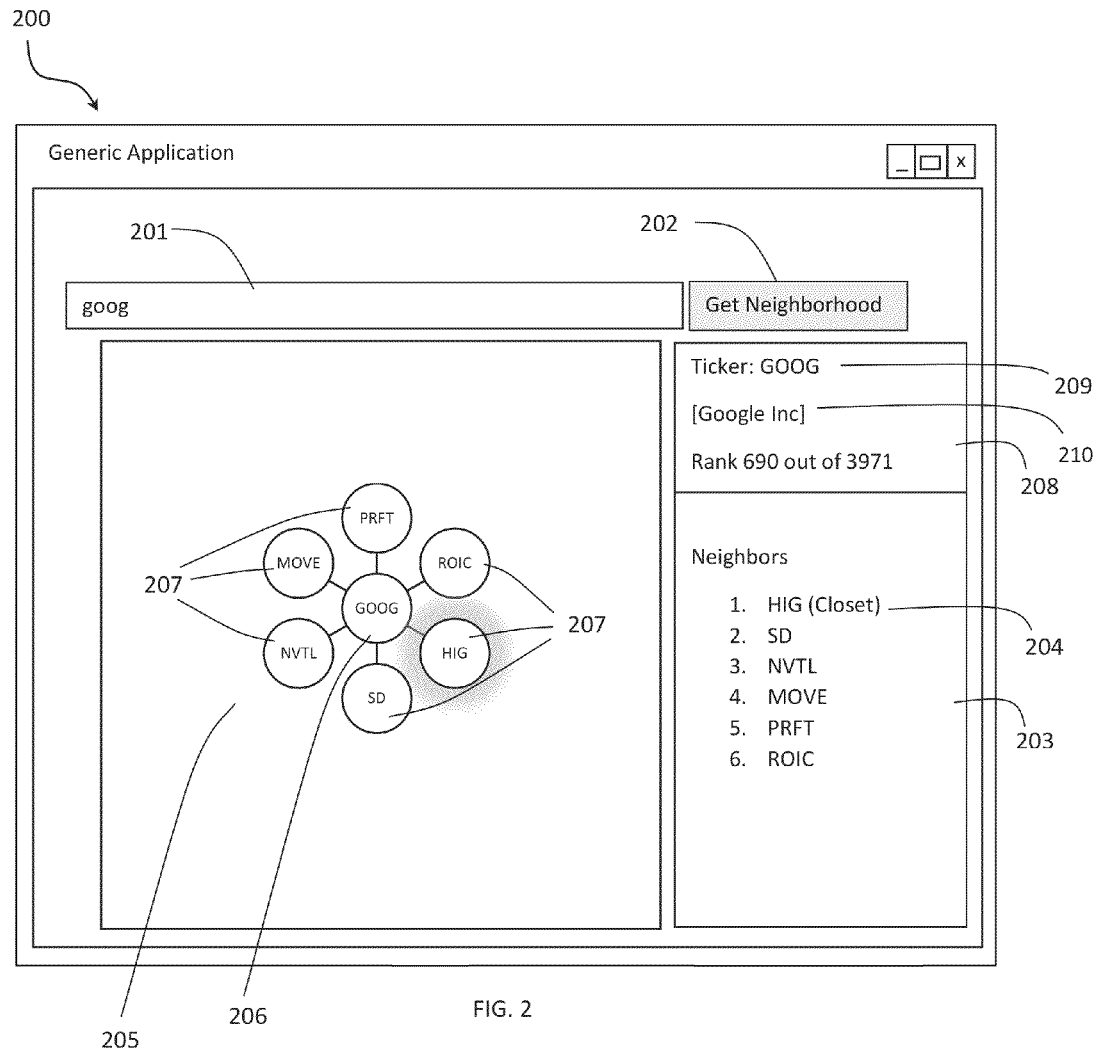
FIG. 2 depicts a screenshot of a stock neighborhood of the GOOGLE stock and the rankings of the GOOGLE and neighbor stock.

FIG. 2 depicts a prototype (200) of the current invention. Any known data sources may be utilized in the current invention, including, but not limited to, crawled data and market data feed. As shown in FIG. 2, the user inputs a stock ticker into the search bar (201) and initiates the program via the "Get Neighborhood" button (202). A stock neighborhood diagram (205) is produced where the user selected ticker is the center circle (206) with the six closest neighbors (207) represented as circles being attached and extending from the user selected ticker in the radial direction. The ranking box (208) provides the user with the selected ticker (209), the corresponding corporation's name (210), and the rank of the selected stock. The neighborhood box (203) indicates the neighbors of the selected stock and identifies the closest neighbor (204).

Example

Producing the Neighborhood

Collaborative filtering relies only on past user behavior. One of the primary areas of collaborative filtering is latent factor models that attempt to explain the ratings by characterizing both items and users inferred from the rating patterns. Some of the most successful realizations of latent factor models are based on matrix factorization. In its basic form matrix factorization characterizes both items and users by vectors of factors inferred from item rating patterns. High correspondence between item and user leads to a recommendation.

The financial market can also be thought of as having this user—item structure and correspondence. Large financial institutions like Goldman Sachs, Morgan Stanley etc. periodically express their opinions about multiple stocks. Instead of giving a rating, the analysts' opinions are typically a suggestion to an investor and the verdict is one of the following: "Buy", "Outperform", "Neutral", "Underperform", "Sell". A "Buy" verdict indicates the stock price will go up in near future and a "Sell" verdict indicates that the price will go down in near future. These opinions (feedback) are transformed into numbers between 0 and 1 (see Table 1 for other values), called the explicit feedback model. If this analyst-stock correspondence is represented in the form of a matrix, where each row represents a certain analyst and each column represents some stock then it will end up with a sparse matrix since most of the analysts opine about only a small subset of all the existing stocks. Using a matrix factorization model, both the analysts and the stocks can be mapped into a latent factor space of dimensionality D, such that the analyst-stock interactions are modeled as inner products in that space. Such a model is closely related to singular value decomposition (SVD), which requires factoring the analyst-stock rating matrix. But conventional SVD is undefined here since the knowledge about the rating matrix is incomplete. However, the goal is to generalize the known ratings in a way that predicts the unknown ratings.

TABLE 1

Transforming Analysts' Opinions to Ratings

| Analysts' Opinions | Ratings |
|---|---|
| Buy | 1.0 |
| Outperform | 0.8 |
| Neutral | 0.6 |
| Underperform | 0.4 |
| Sell | 0.2 |

The number of analysts in the system is represented as $|a|$ and the number of stocks as $|s|$. The resultant sparse matrix will has $|a| \times |s|$ possible values and is represented by matrix as $R = \{r_{ij}\}_{|a| \times |s|}$. In order to do a low rank approximation of R, each analyst and each stock is assumed to have a feature vector of length d (d is the number of hidden features that will be found through the matrix factorization process and it is an important model parameter). Analyst i is represented as $a_i \Sigma \mathbb{R}^d$ and stock j is represented as $s_j \Sigma \mathbb{R}^d$. Let A be the set of feature matrix with dimension ($|a| \times d$) and S be the set of feature matrix with dimension ($|s| \times d$). Also let I be the set of (i, j) pairs in matrix R for which $r_{ij}$ values are known (Analyst i has rated stock j). Given this setup the system attempts to minimize a loss function to obtain matrices A and S based on R. Due to the presence of a large number of free variables, ALS may lead to over-fitting. To mitigate over-fitting, a regularization term is used in the loss function with λ as the important regularization parameter. The regulation parameter is determined by using learning curves.

The loss function that is minimized in the explicit feedback model is given as:

$$f(A,S) = \Sigma_{(i,j) \in I}(r_{ij} - a_i^T s_j)^2 + \lambda(\Sigma_i n_{a_i} \|a_i\|^2 + \Sigma_j n_{s_j} \|s_j\|^2) \qquad (1.1)$$

where $n_{a_i}$ denotes the number of ratings given by analyst i and $n_{s_j}$ denotes the number of ratings received by stock j. Then the problem of low rank matrix factorization is solved by Alternating Least Square (ALS) method (weighted ALS (WALS) may also be used) in the following steps:

Initialize the all stock feature matrix S with small random values.
Fix S and solve A by minimizing the loss function.
Fix A and solve S by minimizing the loss function.
Continue the previous two steps until a certain number of iterations or until the error becomes less than a predetermined threshold.

Due to the presence of a large number of free variables, ALS may lead to over fitting.

To mitigate that, a regularization term is used in the loss function with λ as the important regularization parameter. The learning curves prove that λ=0.06 and a feature length of 10 produces good results.

An analyst almost never provides an opinion for every stock, so an implicit feedback model, which is based on the confidence of a certain analyst for a certain stock, is also considered. If a certain analysts has rated a certain stock, it implicates that the analyst is interested in that stock. On the other hand, if an analyst has not rated a certain stock, it can be either he is not interested in that stock or he is unaware of the existence of that stock. Either way that represents a negative implicit feedback.

Under the implicit feedback model the $r_{ij}$ values are binarized in the following way:

$$p_{ij} = \begin{cases} 1, & \text{if } r_{ij} \text{ is defined} \\ 0, & \text{otherwise} \end{cases} \qquad (1.3)$$

The $r_{ij}$ values are used to measure the confidence in observing $p_{ij}$. It is represented by another set of variables:

$$c_{ij} = 1 + \alpha r_{ij} \qquad (1.4)$$

where α controls the rate of increase in confidence.

The loss function that is minimized in the implicit feedback model is given as:

$$f(A,S) = \Sigma_{(i,j) \in \{1 \ldots n\}} c_{ij}(p_{ij} - a_i^T s_j)^2 + \lambda(\Sigma_{i \in \{1 \ldots n\}} \|a_i\|^2 + \Sigma_{j \in \{1 \ldots n\}} \|s_j\|^2) \qquad (1.2)$$

This has also been solved using the ALS (or WALS) optimization process due to the fact that when either the analyst features or the stock features are fixed the loss function becomes quadratic and the global minima can be readily found by that process. The learning curves prove that λ=0.06 and a feature length of 10 produces good results.

Having discovered a set of d features for each stock, the two feature matrices can be multiplied to produce a completely filled matrix R. An approximate nearest neighbor (ANN) can then be found for each stock, which is computed using STANN—The Simple, Thread-safe Approximate Nearest Neighbor C++ library. The computation is a parallel implementation that uses Morton Ordering for k nearest neighbor graph computation. The Euclidean distance is taken as the distance measure between the points. The details of the nearest neighbor computation can be found in: M. Connor and P. Kumar, *Fast construction of k-nearest neighbor graphs for point clouds. Visualization and Computer Graphics, IEEE Transactions on*, 16(4):599-608, 2010. The price of a certain stock and the prices of its neighbors will likely follow a similar trend allowing the user to gain insight into potential gains.

Ranking Prediction:

One of the primal problems for applying any learning algorithm on financial data is finding a proper feature set that essentially has a very high correlation with the output variable that is being predicted. If the feature set is missing any key features that affects the output, the model will suffer a high bias problem and even an enormous amount of training examples would not be sufficient to have a good prediction accuracy. In case of the stock market, the features that affect the stock price, and thereby the percentage change in price, are rather indirect since stock prices are primarily determined by the rules of supply and demand. The factors that drive either supply or demand are huge and in many cases non-quantifiable. Hence the choice of features becomes really difficult.

Secondly, though there are many conventional indicators available to assess the performance of a single stock, almost all these indicators are static. These indicators change only when a firm publishes their financial reports. At best the indicators change in a quarterly manner. Hence using only these indicators does not seem to be sufficient to predict the percentage change in stock price which almost constantly varies throughout a working day.

Therefore, the preferred embodiment uses the previous day's rankings as training sets instead of conventional static indicators i.e. indicators that do not change on a daily basis. The use of the previous day's rankings as training sets encompasses the entire market dynamics while predicting ranks and at the same time provides a self-correcting feedback notion. The current invention could also use traded volume for a certain day, or any other feature that frequently changes, as an indicator. The number of previous day's data is configurable and another embodiment of the invention may allow the user to determine the number of previous day's data to be used in the prediction.

First n stocks are denoted as $s_i \epsilon \{1 \ldots n\}$. A list of n items can be easily converted to any of n! orderings using n×n permutation matrices. $\pi_1$ and $\pi_2$ denote two permutations of all the stocks. A n×n permutation matrix P is found, that converts $\pi_1$ to $\pi_2$. A loss function is then determined that will measure the distance between the two permutations so that the function can be minimized to find the entries of P. The sum total of the squared distance between the ranks of a certain stock is taken in two different permutations as the loss function. To convert $\pi_1$ to $\pi_2$, let $$\pi_1' = P \cdot \pi_1 \quad (1.5)$$

In permutation $\pi_1'$ the rank of stock $s_i$ is denoted by $$r_{s_i}^{\pi_1'}$$

and in permutation $\pi_2$ the rank of stock $s_i$ is denoted by $r_{s_i}^{\pi_2}$, resulting in the loss function being:

$$J(\pi_1, \pi_2) = \sum_{i \in \{1 \ldots n\}} \left(r_{s_i}^{\pi_2} - r_{s_i}^{\pi_1'}\right)^2 \quad (1.6)$$

Hence P is found if $J(\pi_1, \pi_2)$ from 1.6 is minimized. The optimization problem is an Integer Program, so IBM's CPLEX solver is used. The solver can solve this problem exactly for small values of n (i.e. when the number of stocks are small).

Having multiple permutation pairs like $(\pi_1, \pi_2)$, the model can be extended to find an optimal permutation matrix P and thereby an optimal permutation $\pi_i$ just by modifying the optimization function, without increasing the number of free variables.

Let $\pi_i$ denote the ranking of stocks for the ith day and there are m such days' rankings hence $i \epsilon 1 \ldots m$. Given these rankings, P can be found and thereby $\pi_{m+1}$ such that P minimizes the distances of two successive days' rankings $$\pi_i' = P \cdot \pi_i = \begin{bmatrix} x_{11} & x_{12} & \ldots & x_{1n} \\ x_{21} & x_{22} & \ldots & x_{2n} \\ \vdots & \vdots & \ddots & \vdots \\ x_{n1} & x_{n1} & \ldots & x_{nn} \end{bmatrix} \begin{bmatrix} r_{s_1}^{\pi_i} \\ r_{s_2}^{\pi_i} \\ \vdots \\ r_{s_n}^{\pi_i} \end{bmatrix} \quad (1.7)$$

The $x_{kj}$'s are the free variables which take the value 0 or 1. All the $r_{s_j}^{\pi_i}$'s are known. The loss function becomes:

$$J(\pi_1, \ldots, \pi_m) = \sum_{i \in \{1 \ldots n\}, j \in \{1 \ldots m-1\}} \left(r_{s_i}^{\pi_{j+1}} - r_{s_i}^{\pi_j'}\right)^2 \quad (1.8)$$

To utilize the CPLEX solver, the current invention splits the stocks into smaller groups of 200, generates the CPLEX input files in lp format, which requires symbolic squaring, and later merges the smaller groups to generate a ranking. Further description of the foregoing steps are described in the following reference:

Rajat Raychaudhuri, *Application of Learning Algorithms on Mining and Ranking Financial Data*, defended Dec. 5, 2012.

The foregoing reference is incorporated herein by reference.

Software Implementation

Certain embodiments of the current invention include a computer-implemented software application. The software is accessible from a non-transitory, computer-readable media and provide instructions for a computer processor to rank stocks, develop stock neighborhoods, and/or predict pricing within a stock market.

The computer-readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

GLOSSARY

Analyst: is a financial analyst or institution that provides opinions on stocks.

Approximate Nearest Neighbor Computation: is an optimization problem for finding closest points in metric spaces.

Collaborative Filtering: is a model that maps both users and items to a joint latent factor space of dimensionality d, such that user-item interactions are modeled as inner products in that space.

Data: is financial data that relates to stock valuation, including price-to-earnings ratio, percentage change in price, earnings per share estimates, analysts' opinions, etc.

Explicit Opinions: are opinions stated clearly and in detail, leaving no room for confusion or doubt.

Gathered Form: the form of data when retrieved from the source.

K Nearest Neighbor Graph Construction: is a directed graph (for a set of objects V) with vertex set V and an edge from each v E V to its K most similar objects in V under a given similarity measure.

Latent Factor Space: is a space representing the observed factors in terms of latent factors.

Matrix: is a rectangular array of quantities or expressions in rows and columns that is treated as a single entity and manipulated according to particular rules.

Morton Ordering: is the action of a function which maps multidimensional data to one dimension while preserving locality of the data points.

Neighborhood Data: is data that will be used in determining the stock neighborhood.

Prediction Data: is data that will be used in predicting the stock rankings

Ranking Optimization Method: is an optimization problem for ranking

Stock Market: is a stock exchange.

Stock Neighbor: is a stock having a close association with another stock, which may be determined through an approximate nearest neighbor computation.

Stock: is a type of security signifying ownership in a corporation.

Stock-Data Matrix: is a matrix of stocks and corresponding data.

Training Set: a set of data used to discover potentially predictive relationships.

Web Crawler: is a computer program that browses the World Wide Web in a methodical, automated manner or in an orderly fashion.

What is claimed is:

1. One or more non-transitory tangible computer-readable media having computer-executable instructions for performing a method by running a software program on a computer, the computer operating under an operating system, the method including issuing instructions from the software program to gather financial data for each stock, fabricate a stock neighborhood for each stock, and predict the rankings of each stock, the instructions comprising:

gathering, from the web, data on a plurality of stocks registered in a stock market and storing the data in a database;
the data including neighborhood data and prediction data;
transforming the neighborhood data from the gathered form into normalized numerical ratings;
receiving a selection, from a user, of a particular stock from the plurality of stocks;
automatically generating a plurality of stock neighbors, for the user selected stock, originating from the plurality of stocks, the step of generating a plurality of stock neighbors further comprising:
producing at least one stock-data matrix;
the stock-data matrix further comprising:
each row representing transformed neighborhood data and each column representing a certain stock or vice versa, wherein the resulting elements of the matrices represents specific neighborhood data of the corresponding stock;
applying collaborative filtering to the stock-data matrix to map out a latent factor space for the data and the stocks;
implementing an approximate nearest neighbor computation;
returning to the user the plurality of stock neighbors of the inputted stock;
automatically predicting the rankings of the plurality of stocks based on previous prediction data using a ranking optimization method; and
returning to the user the predicted ranking of the inputted stock and the predicted ranking of the plurality of stock neighbors of the inputted stock.

2. One or more non-transitory tangible computer-readable media as in claim 1, further comprising:
the neighborhood data including explicit analysts' opinions having a gathered form of "buy", "outperform", "neutral", "underperform", or "sell".

3. One or more non-transitory tangible computer-readable media as in claim 1, further comprising:
the prediction data including opening and closing prices of stocks, wherein the opening and closing prices are transformed into percentage change in price.

4. One or more non-transitory tangible computer-readable media as in claim 1, further comprising:
- the data being gathered and stored on a database through the use of a web crawler.

5. One or more non-transitory tangible computer-readable media as in claim 1, further comprising:
- the approximate nearest neighbor computation comprising:
  - a parallel algorithm that uses Morton Ordering for k nearest neighbor graph construction.

6. One or more non-transitory tangible computer-readable media as in claim 1, further comprising:
- receiving user input regarding the amount of previous data to be used in predicting the ranking of the plurality of stocks and producing the stock neighborhood.

7. One or more non-transitory tangible computer-readable media as in claim 1, further comprising:
- the ranking optimization method using previous days' rankings as a training set.

8. One or more non-transitory tangible computer-readable media having computer-executable instructions for performing a method by running a software program on a computer, the computer operating under an operating system, the method including issuing instructions from the software program to gather financial data for each stock, fabricate a stock neighborhood for each stock, and predict the rankings of each stock, the instructions comprising:
- gathering, from the web, data on a plurality of stocks registered in a stock market and storing the data in a database;
  - the data further comprising:
    - neighborhood data, wherein the neighborhood data is explicit analysts' opinions having a gathered form of "buy", "outperform", "neutral", "underperform", or "sell";
    - prediction data, wherein the prediction data is opening and closing prices of stocks;
- transforming the neighborhood data from the gathered form into normalized numerical ratings;
- transforming the prediction data from the gathered form into percentage change in price;
- receiving a selection, from a user, of a particular stock from the plurality of stocks;
- automatically generating a plurality of stock neighbors, for the user selected stock, originating from the plurality of stocks, the step of generating a plurality of stock neighbors further comprising:
  - producing at least one stock-data matrix;
    - the stock-data matrix further comprising:
      - each row representing transformed neighborhood data and each column representing a certain stock or vice versa, wherein the resulting elements of the matrices represents specific neighborhood data of the corresponding stock;
  - applying collaborative filtering to the stock-data matrix to map out a latent factor space for the data and the stocks;
  - implementing an approximate nearest neighbor computation;
- returning to the user the plurality of stock neighbors of the inputted stock;
- automatically predicting the rankings of the plurality of stocks based on previous transformed prediction data using a ranking optimization method;
  - the ranking optimization method using previous days' rankings as a training set; and
- returning to the user the predicted ranking of the inputted stock and the predicted ranking of the plurality of stock neighbors of the inputted stock.

9. One or more non-transitory tangible computer-readable media as in claim 8, further comprising:
- the data being gathered and stored on a database through the use of a web crawler.

10. One or more non-transitory tangible computer-readable media as in claim 8, further comprising:
- the approximate nearest neighbor computation comprising:
  - a parallel algorithm that uses Morton Ordering for k nearest neighbor graph construction.

11. One or more non-transitory tangible computer-readable media as in claim 8, further comprising:
- receiving user input regarding the amount of previous data to be used in predicting the ranking of the plurality of stocks and producing the stock neighborhood.

12. One or more non-transitory tangible computer-readable media as in claim 8, further comprising:
- the ranking optimization method using previous days' rankings as a training set.

13. One or more non-transitory tangible computer-readable media having computer-executable instructions for performing a method by running a software program on a computer, the computer operating under an operating system, the method including issuing instructions from the software program to gather financial data for each stock, fabricate a stock neighborhood for each stock, and predict the rankings of each stock, the instructions comprising:
- gathering, from the web, data on a plurality of stocks registered in a stock market and storing the data in a database, wherein the gathering and storing is achieved through use of a web crawler;
  - the data further comprising:
    - neighborhood data, wherein the neighborhood data is explicit analysts' opinions having a gathered form of "buy", "outperform", "neutral", "underperform", or "sell";
    - prediction data, wherein the prediction data is opening and closing prices of stocks;
- transforming the neighborhood data from the gathered form into normalized numerical ratings;
- transforming the prediction data from the gathered form into percentage change in price;
- receiving a selection, from a user, of a particular stock from the plurality of stocks;
- automatically generating a plurality of stock neighbors, for the user selected stock, originating from the plurality of stocks, the step of generating a plurality of stock neighbors further comprising:
  - producing at least one stock-data matrix;
    - the stock-data matrix further comprising:
      - each row representing transformed neighborhood data and each column representing a certain stock or vice versa, wherein the resulting elements of the matrices represents specific neighborhood data of the corresponding stock;
  - applying collaborative filtering to the stock-data matrix to map out a latent factor space for the data and the stocks;
  - implementing an approximate nearest neighbor computation;
    - the approximate nearest neighbor computation comprising:
      - a parallel algorithm that uses Morton Ordering for k nearest neighbor graph construction;

returning to the user the plurality of stock neighbors of the inputted stock;

automatically predicting the rankings of the plurality of stocks based on previous transformed prediction data using a ranking optimization method;

the ranking optimization method using previous days' rankings as a training set; and returning to the user the predicted ranking of the inputted stock and the predicted ranking of the plurality of stock neighbors of the inputted stock.

14. One or more non-transitory tangible computer-readable media as in claim 13, further comprising:

receiving user input regarding the amount of previous data to be used in predicting the ranking of the plurality of stocks and producing the stock neighborhood.

* * * * *